(12) United States Patent
Guiselin et al.

(10) Patent No.: US 8,119,707 B2
(45) Date of Patent: Feb. 21, 2012

(54) TREATED ALUMINA HYDRATE MATERIAL AND USES THEREOF

(75) Inventors: Olivier Guiselin, Northboro, MA (US); Nathalie Pluta, Algrange (FR); Yves Boussant-Roux, Lexington, MA (US); Doruk O. Yener, Grafton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 329 days.

(21) Appl. No.: 11/947,482

(22) Filed: Nov. 29, 2007

(65) Prior Publication Data

US 2008/0171811 A1 Jul. 17, 2008

Related U.S. Application Data

(60) Provisional application No. 60/868,856, filed on Dec. 6, 2006.

(51) Int. Cl.
*C08K 9/06* (2006.01)

(52) U.S. Cl. ........ 523/216; 428/403; 428/402; 428/404; 523/200; 523/210; 524/437; 524/493; 423/625; 423/628; 423/626

(58) Field of Classification Search ............... 523/200, 523/210
See application file for complete search history.

(56) References Cited

U.S. PATENT DOCUMENTS

| | | | |
|---|---|---|---|
| 3,832,442 A * | 8/1974 | Emerson | 423/111 |
| 4,588,443 A | 5/1986 | Bache | |
| 4,717,560 A | 1/1988 | Vaughan | |
| 4,781,982 A | 11/1988 | Musselman et al. | |
| 4,797,139 A | 1/1989 | Bauer | |
| 5,401,568 A | 3/1995 | Haehn et al. | |
| 5,484,818 A * | 1/1996 | De Vos et al. | 521/123 |
| 5,900,449 A | 5/1999 | Custodero et al. | |
| 5,968,470 A | 10/1999 | Persello | |
| 6,048,577 A * | 4/2000 | Garg | 427/215 |
| 6,130,283 A * | 10/2000 | Nippa et al. | 524/437 |
| 6,382,538 B1 * | 5/2002 | Nippa et al. | 241/30 |
| 6,613,383 B1 * | 9/2003 | George et al. | 427/212 |
| 6,624,233 B2 * | 9/2003 | Amaddeo et al. | 524/493 |
| 7,438,977 B2 | 10/2008 | Takemura | |
| 2004/0258553 A1 | 12/2004 | Litvintsey et al. | |
| 2005/0089582 A1 | 4/2005 | Zapf et al. | |
| 2005/0090595 A1 * | 4/2005 | Nippa | 524/437 |
| 2005/0233135 A1 | 10/2005 | Iyer et al. | |
| 2006/0100325 A1 | 5/2006 | Leite et al. | |
| 2006/0182903 A1 | 8/2006 | Sakaguchi et al. | |
| 2007/0163470 A1 | 7/2007 | Chanut et al. | |
| 2008/0138622 A1 | 6/2008 | Guiselin et al. | |

FOREIGN PATENT DOCUMENTS

| | | |
|---|---|---|
| EP | 0407262 B1 | 5/1994 |
| EP | 0810258 B1 | 10/2001 |
| JP | 2006219356 A | 8/2006 |
| WO | 2006002993 A1 | 11/2007 |

OTHER PUBLICATIONS

Ciullo et alli, "The Rubber Formulary"; Williams Andrew, Inc. 1999, p. 28.*
Remco Engineering, "Ion Exchange: Basic Concepts" [online], Feb. 1, 2003 [retrieved Jul. 6, 2009], www.remco.com/ix.htm.*
Non-Final Office Action mailed Sep. 8, 2009, from U.S. Appl. No. 11/947,492, filed Nov. 29, 2007.
Non-Final Office Action mailed May 27, 2010, from U.S. Appl. No. 11/947,492, filed Nov. 29, 2007.
Notice of Allowance mailed Dec. 9, 2010, from U.S. Appl. No. 11/947,492, filed Nov. 29, 2007.

* cited by examiner

*Primary Examiner* — Doris Lee
(74) *Attorney, Agent, or Firm* — Abel Law Group, LLP

(57) ABSTRACT

A composite material includes a polymer matrix and a particulate material dispersed within the polymer matrix. The particulate material includes metal oxide coated alumina hydrate. The particulate material has a 500 psi Compaction Volume Ratio of at least about 4.0 cc/cc. The metal oxide coating may include precipitated silica. The particulate material may have a Hg Cumulative Pore Volume of at least 1.65 cc/g.

24 Claims, No Drawings

TREATED ALUMINA HYDRATE MATERIAL AND USES THEREOF

CROSS REFERENCE TO RELATED APPLICATIONS

The present application claims priority from U.S. Provisional Patent Application No. 60/868,856, filed Dec. 6, 2006, entitled "TREATED ALUMINA HYDRATE MATERIAL AND USES THEREOF", naming inventors Olivier Guiselin, Nathalie Pluta, Yves Boussant-Roux, and Doruk O. Yener, which application is incorporated by reference herein in its entirety.

FIELD OF THE DISCLOSURE

The present application is related generally to treated alumina hydrate particulate materials and uses of such particulate materials.

BACKGROUND

Inorganic particulate materials are commonly blended with polymeric materials to form composite materials. For example, such inorganic particulate materials may be blended with thermoset polymers to form thermally-stable high-strength polymer composites. In another example, such inorganic particulate materials may be blended with curable elastomeric resins to form reinforced elastomeric composites.

As such, inorganic particulate materials may be used as filler and may function as reinforcements, colorants, or radiation absorbers. For example, zirconia and titania are commonly used as whitening agents and ultraviolet radiation absorbers. In another example, carbon black is typically used to form dark composites that withstand ultraviolet radiation. In a particular example, inorganic particulate materials are used in elastomeric composites for manufacturing tires. In addition to carbon black, precipitated silica is often used to provide low rolling resistance, for example, to reduce gas consumption, and wet surface traction.

In order to reduce fuel consumption, attempts have been made by tires producers to obtain tires with low rolling resistance. In addition, tire manufacturers have desire improved grip on both on wet and dry conditions, and wear resistance. As such, manufacturers have typically turned to a sulfur-vulcanizable diene rubber composition obtained by thermo-mechanical working of a conjugated diene copolymer and an aromatic vinyl compound, and reinforced with special highly dispersible precipitated silica. Highly dispersible precipitated silica is made of spherical primary particles, which are aggregated together. These primary particles typically have a low aspect ratio, generally around 1.

The so called "green tires" have had a significant commercial success in passenger car market in Europe and more recently in North America. However the development of green tires for trucks has been more difficult due to a lower wear resistance than conventional truck tire reinforced mainly with carbon black.

Turning to aluminous materials, nano-boehmite particles can be easily dispersed into a nylon polymer matrix due to the high surface compatibility between the boehmite material and the highly polar polymer matrix. However, nano-boehmite particles are difficulty to disperse in a non-polar matrix, such a diene rubber composition for a tire formulation. In general, higher aspect ratio nano-boehmite particles are more difficult to disperse in rubber.

Numerous solutions have been proposed to improve the dispersion of inorganic nano-particles with high aspect ratio in non polar polymers. For example, organic surface treatment agents that modify the surface chemistry of the particles to make it more compatible with the polymer have been proposed. Such an approach, for example, has been used to disperse nano-clay in Nylon or polypropylene using quaternary ammonium as an organic surface treatment agent. However, even with the organic agents, it is often difficult to achieve desirable dispersion of such inorganic particulate, especially if the filler loading is high (more than 10% per volume). Moreover, in the case of tire formulation, an organic surface treatment may not be desirable. For example, it may be desirable for the surface of the reinforcing fillers to react with a polysulfurized silane coupling agent during the compounding process, and thus can not be passivated by the organic surface treatment agent.

As such, a dispersible filler and composite material formed thereof would be desirable.

SUMMARY

In a particular embodiment, a particulate material includes alumina hydrate. The particulate material has a 500 psi Compaction Volume Ratio of at least about 4.0 cc/cc.

In another embodiment, a particulate material comprising metal oxide coated alumina hydrate. The particulate material has a 500 psi Compaction Volume Ratio of at least about 4.0 cc/cc.

In yet another exemplary embodiment, a particulate material includes alumina hydrate. The particulate material has a Cumulative Pore Volume Ratio of at least about 3.0.

In a further exemplary embodiment, a particulate material includes alumina hydrate. The particulate material has an Hg Cumulative Pore Volume Index of at least about 3.0 cc/cc.

In another exemplary embodiment, a particulate material includes a seeded alumina hydrate. The particulate material has an isoelectric point of not greater than about 5.

In a further exemplary embodiment, a method of making a particulate material includes adding an inorganic salt comprising an oxidized metal anion to an alumina hydrate suspension. The method further includes adding an acidifying agent to the alumina hydrate suspension, whereby a layer of metal oxide is precipitated onto alumina hydrate particles of the alumina hydrate suspension to form a particulate material.

In yet another exemplary embodiment, a method of making a particulate material includes adding an inorganic silicate salt to an alumina hydrate suspension. The method further includes adding an acidifying agent to the alumina hydrate suspension and reacting to precipitate a layer of silica onto alumina hydrate particles in the alumina hydrate suspension to form the particulate material.

In another exemplary embodiment, a particulate material includes transition alumina. The particulate material has an Hg Cumulative Pore Volume Index of at least about 3.0 cc/cc.

In yet another exemplary embodiment, a particulate material includes transition alumina. The particulate material has a 500 psi Compaction Volume Ratio of at least about 4.0 cc/cc.

In a further exemplary embodiment, a particulate material includes alpha alumina. The particulate material has an Hg Cumulative Pore Volume Index of at least about 3.0 cc/cc.

In another exemplary embodiment, a particulate material includes alpha alumina. The particulate material has a 500 psi Compaction Volume Ratio of at least about 4.0 cc/cc.

In yet another exemplary embodiment, a catalyst includes a particulate material and a catalytic agent on the surface of the particulate material. The particulate material has a 500 psi Compaction Volume Ratio of at least about 4 cc/cc.

In a further exemplary embodiment, an inkjet paper includes a paper substrate and a coating disposed on at least one side of the paper substrate. The coating includes a particulate material having a 500 psi Compaction Volume Ratio of at least about 4.0 cc/cc.

In another exemplary embodiment, a composite material includes a polymer matrix and a particulate material dispersed within the polymer matrix. The particulate material has a 500 psi Compaction Volume Ratio of at least about 4.0 cc/cc.

In yet another exemplary embodiment, a composite material includes a polymer matrix and an aggregate. The aggregate includes a particle with a geometric aspect ratio of at least about 3.0. Additionally, the aggregate has a Dispersibility Index of at least 94%.

In another exemplary embodiment, a particulate material comprises an aggregate. The aggregate includes a particle with a geometric aspect ratio of at least about 3.0. Additionally, the aggregate has a Dispersibility Index of at least about 94%.

In a further exemplary embodiment, a particulate material includes a metal oxide coated alumina hydrate. The particulate material has a Dispersibility Index of at least about 90%.

In another exemplary embodiment, a method of making an article includes mixing a particulate material with a polymer resin. The particulate material comprises alumina hydrate. Further, the particulate material has a 500 psi Compaction Volume Ratio of at least about 4.0 cc/cc.

In a further exemplary embodiment, a composite material comprises a silicone matrix and a particulate material dispersed within the silicone matrix. The particulate material includes an alumina hydrate. Additionally, the particulate material has a 500 psi Compaction Volume Ratio of at least about 4.0 cc/cc.

DETAILED DESCRIPTION

In a particular embodiment, a particulate material includes treated alumina hydrate, such as silica coated alumina hydrate. In an example, the particulate material can have a 500 psi Compaction Volume Ratio (the ratio of the volume of the air to the volume of the solid when the solid is compressed at 500 psi) of at least about 4.0 cc/cc, indicating a relatively high porosity and relatively high compaction strength. In addition, the particulate material may have an Hg Cumulative Pore Volume Index (porosity in the pore size range between 10 and 1000 nm multiplied by the specific density of the particulate material) of at least about 3.0 cc/cc. In a particular embodiment, the particulate material includes silica coated alumina hydrate in which the alumina hydrate includes boehmite and the silica coating comprises about 10% to about 50% by weight of the particulate material.

In an exemplary embodiment, a method of manufacturing a treated alumina hydrate material includes reacting an inorganic salt solution (such as sodium silicate or sodium tungstate) with an acidifying agent in the presence of an alumina hydrate particulate, thus precipitating a layer of metal oxide onto the alumina hydrate particulate to form a metal oxide coated alumina hydrate material. Further, the method may include washing the metal oxide coated alumina hydrate material to remove excess salts and drying the metal oxide coated alumina hydrate material to obtain a dry particulate material. The metal oxide forming the coating of the metal oxide coated alumina hydrate may have an iso-electric point of not greater than about 6.0. In another embodiment, an additive, such as citric acid, is added to a solution of alumina hydrate particles to lower the iso-electric point of the alumina hydrate particles prior to the addition of the inorganic salt solution to better control the particle agglomeration prior to the metal oxide coating.

In a further exemplary embodiment, a composite material includes a polymer matrix and a metal oxide coated alumina hydrate material dispersed within the polymer matrix. The metal oxide coated alumina hydrate material may have a 500 psi Compaction Volume Ratio of at least about 4.0 cc/cc, or an Hg Cumulative Pore Volume Index of at least about 3.0 cc/cc, indicating a relatively high porosity and relatively high compaction strength.

In an additional exemplary embodiment, a method of making an article comprises mixing a particulate material with a polymer resin. The particulate material includes a metal oxide coated alumina hydrate. Additionally, the method may include mixing a coupling agent with the polymer. Alternatively, the method may include pre-treating the particulate material with a coupling agent. Further, the method may include molding the polymer resin and curing the polymer resin.

Alumina Hydrate Particulate

In general, the alumina hydrate particulate includes hydrated alumina conforming to the formula: $Al(OH)_a O_b$, where $0 \leq a \leq 3$ and $b=(3-a)/2$, with the exception of impurities. In a particular embodiment, $1 \leq a \leq 2$. By way of example, when a=0 the formula corresponds to alumina ($Al_2O_3$). In general, the alumina hydrate particulate material has a water content of about 1% to about 38% by weight, such as about 15% to about 38% water content by weight.

In particular, the alumina hydrate particulate may include aluminum hydroxides, such as ATH (aluminum tri-hydroxide), in mineral forms known commonly as gibbsite, bayerite, or bauxite, or may include alumina monohydrate, also referred to as boehmite. Such mineral form aluminum hydroxides may form alumina hydrate particulate material useful in forming the particulate or may be used as an aluminous precursor, for further processing, such as in a seeded hydrothermal treatment, described in more detail below.

With particular reference to the morphologies of the alumina hydrate particles, different morphologies are available, such as needle-shaped, ellipsoidal-shaped, and platelet-shaped particles. For example, particles having a needle-shaped morphology may be further characterized with reference to a primary aspect ratio defined as the ratio of the longest dimension to the second longest dimension perpendicular to the longest dimension and a secondary aspect ratio defined as the ratio of the second longest dimension to the third longest dimension perpendicular to the first and second longest dimensions. The primary aspect ratio of needle-shape particle is generally greater than 2:1, preferably greater than 3:1, and more preferably greater or equal to 6:1. The secondary aspect ratio generally describes the cross-sectional geometry of the particles in a plane perpendicular to the longest dimension. The secondary aspect ratio of needle-shaped particles is generally not greater than about 3:1, typically not greater than about 2:1, or not greater than about 1.5:1, and oftentimes about 1:1.

According to another embodiment, the alumina hydrate particles may be platy or platelet-shaped particles generally of an elongated structure. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally at least about 3:1, such as at least about 6:1, or at least about 10:1. Typically, the shortest dimension or edge dimension, perpendicular to the opposite major surfaces or faces, is generally less than 50 nanometers, such as less than about 40 nanometers, or less than about 30 nanometers.

According to another embodiment, a cluster of platelet-shaped particles can generally form an elongated ellipsoidal structure having a primary aspect ratio described above in connection with the needle-shaped particles. In addition, the ellipsoidal-shaped cluster may be characterized as having a secondary aspect ratio not greater than about 2:1, not greater than about 1.5:1, or about 1:1.

According to an embodiment, the alumina hydrate particles have a geometric aspect ratio, defined as the ratio of the longest dimension to the square root of the product of the shorter two orthogonal dimensions, generally at least about 3.0, and, in particular, at least about 4.5, such as at least about 6.0. Generally, needle-shape particles have a higher geometric aspect ratio than platelet-shaped particles and ellipsoidal-shaped particles of comparable size. Typically, the geometric aspect ratio correlates with dispersion of untreated alumina hydrate particles.

Morphology of the alumina hydrate particulate material may be further defined in terms of particle size and, more particularly, average particle size. As used herein, the "average particle size" is used to denote the average longest or length dimension of the alumina hydrate particles. Generally, the average particle size is not greater than about 1000 nanometers, such as about 30 nanometers to about 1000 nanometers. For example, the average particle sizes may be not greater than about 800 nanometers, not greater than about 500 nanometers, or not greater than about 300 nanometers. In the context of fine particulate material, embodiments have an average particle size not greater than 250 nanometers, such as not greater than 225 nanometers. Due to process constraints of certain embodiments, the smallest average particle size is generally at least about 30 nanometers, such as at least about 50 nanometers, or at least about 100 nanometers. In particular, the average particle size may be about 30 nanometers to about 1000 nanometers, such as about 50 nanometers to about 250 nanometers, or about 100 nanometers to about 200 nanometers.

Due to the elongated morphology of the particles, conventional characterization technology is generally inadequate to measure average particle size, since characterization technology is generally based upon an assumption that the particles are spherical or near-spherical. Accordingly, average particle size is determined by taking multiple representative samples and physically measuring the particle sizes found in representative samples. Such samples may be taken by various characterization techniques, such as by scanning electron microscopy (SEM). The term average particle size also denotes primary particle size, related to the individually identifiable particles, whether in dispersed, aggregated, or agglomerated forms. The term aggregate denotes a group of primary particles, which are strongly bound together, and the term agglomerate denotes a group of aggregates that are weakly bond together. In general, it is easier to measure the size of the primary particles before they are aggregated together. Typically, aggregates and agglomerates have a comparatively larger average size. For example, aggregates may have an average size of about 250 nm to about 2000 nm, such as about 300 nm to about 1000 nm, or even about 300 nm to about 600 nm. In another example, agglomerates may have a size greater than about 2000 nm, such as greater than about 10 microns, or even as high as 100 microns.

In a particular embodiment, when a is approximately one (1) within the general formula: $Al(OH)_aO_b$, where $0<a\leqq3$ and $b=(3-a)/2$, the alumina hydrate material corresponds to boehmite. More generally, the term "boehmite" is used herein to denote alumina hydrates including mineral boehmite, typically being $Al_2O_3.H_2O$ and having a water content on the order of 15%, as well as pseudo-boehmite, having a water content greater than 15%, such as 20% to 38% by weight. As such, the term "boehmite" will be used to denote alumina hydrates having 15% to 38% water content, such as 15% to 30% water content by weight. It is noted that boehmite (including pseudo-boehmite) has a particular and identifiable crystal structure, and accordingly, a unique X-ray diffraction pattern, and as such, is distinguished from other aluminous materials including other hydrated aluminas.

Boehmite may be obtained by processing aluminous minerals, such as an aluminous precursor through a seeded processing pathway, to provide desirable morphology and particle characteristics. Alumina hydrate particles formed through a seeded process are particularly suited for forming treated alumina hydrate agglomerates, as described below. Such seeded processing advantageously may provide desirable particle morphologies and the particles formed by such processes may be further treated without removing them from solution, such as the solution in which they were formed in situ.

Turning to the details of the processes by which the seeded aluminous particulate material may be manufactured, typically an aluminous material precursor including bauxitic minerals, such as gibbsite and bayerite, are subjected to hydrothermal treatment as generally described in the commonly owned patent, U.S. Pat. No. 4,797,139. More specifically, the particulate material may be formed by combining the precursor and seeds (having desired crystal phase and composition, such as boehmite seeds) in suspension, exposing the suspension (alternatively sol or slurry) to heat treatment to cause conversion of the raw material into the composition of the seeds (in this case boehmite). The seeds provide a template for crystal conversion and growth of the precursor. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns, preferably less than 100 nm, and even more preferably less than 10 nm. In the case in which the seeds are agglomerated, the seed particles size refers to seed primary particles size. Generally, the seed particles are present in an amount greater than about 1% by weight of the boehmite precursor, typically at least 2% by weight, such as 2 to 40% by weight, more typically 5 to 15% by weight (calculated as $Al_2O_3$). Precursor material is typically loaded at a percent solids content of 60% to 98%, preferably 85% to 95%. Alternatively, the total loading of the solid material is about 10% to about 50%, such as about 15% to about 30%.

Heating is carried out at a temperature greater than about 100° C., such as greater than about 120° C., or even greater than about 130° C. In an embodiment, the processing temperature is greater than 150° C. Usually, the processing temperature is below about 300° C., such as less than about 250° C. Processing is generally carried out in the autoclave at an elevated pressure, such as within a range of about $1\times10^5$ newtons/m$^2$ to about $8.5\times10^6$ newtons/m$^2$. In one example, the pressure is autogenously generated, typically around $2\times10^5$ newtons/m$^2$.

In the case of relatively impure precursor material, such as bauxite, the material is washed, such as rinsing with deionized water, to flush away impurities such as silicon and titanium hydroxides and other residual impurities remaining from the mining processes to source bauxite.

The particulate aluminous material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles or larger particles in general. Time periods typically range from about 1 to 24 hours, preferably 1 to 3 hours.

Following heat treatment and crystalline conversion, the liquid content is generally removed, desirably through a process that limits agglomeration of the particles of boehmite upon elimination of water, such as freeze drying, spray drying, or other techniques to prevent excess agglomeration. In certain circumstances, ultrafiltration processing or heat treatment to remove the water might be used. Thereafter, the resulting mass may be crushed, such as to 100 mesh, if desired. It is noted that the particulate size described herein generally describes the single crystallites formed through processing, rather than any aggregates or agglomerates that may remain in certain embodiments.

Alternatively, the particulate aluminous material may be kept in suspension, forming a colloidal suspension. For example, the particulate aluminous material may be maintained in situ sol. In another example, the liquid content in which the particulate aluminous material is suspended may be replaced through washing, liquid-liquid exchange, or other separation techniques that result in the particulate aluminous material remaining in colloidal suspension. In particular, such colloidal suspended particulate aluminous materials provide advantages when further treated.

Several variables may be modified during the processing of the particulate material to effect the desired morphology. These variables notably include the weight ratio, that is, the ratio of precursor (i.e., feed stock material) to seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at 180° C. for two hours in a 2 weight % nitric acid solution, a 90:10 ATH:boehmite ratio (precursor:seed ratio) forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreased aspect ratio.

Further, when the type of acid or base is modified, holding the other variables constant, the shape (e.g., aspect ratio) and size of the particles are affected. For example, when processing is carried out at 180° C. for two hours with an ATH:boehmite seed ratio of 90:10 in a 2 weight % nitric acid solution, the synthesized particles are generally needle-shaped. In contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. When a mixture of acids and bases is utilized, such as 1 weight % KOH and 0.7 weight % nitric acid, the morphology of the synthesized particles is platelet-shaped. Noteworthy, the above weight % values of the acids and bases are based on the solids content only of the respective solid suspensions or slurries, and are not based on the total weight of the slurries.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the crystalline size was found to be 143 Angstroms. Accordingly, as temperature is increased, average particle size is also increased, representing a directly proportional relationship between average particle size and temperature.

According to embodiments described herein, a relatively powerful and flexible process methodology may be employed to engineer desired morphologies into the particulate material. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired particulate material morphologies.

In the context of seeded aluminous particulate material, particular significance is attributed to the seeded processing pathway, as not only does seeded processing to form seeded particulate material allow for tightly controlled morphology of the precursor (which is largely preserved in the final product), but also the seeded processing route is believed to manifest desirable physical properties in the final product, including compositional, morphological, and crystalline distinctions over particulate material formed by conventional, non-seeded processing pathways.

Additional characterization studies were carried out to more precisely understand the effect of seeding on particle morphology. The seeded particles have a nodular structure, in that the particles are 'bumpy' or 'knotty' and have a generally rough outer texture. Further characterization was carried out by TEM analysis to discover that what appears by SEM to be generally monolithic particles, the particles are actually formed of tight, dense assemblies of platelet particles. The particles have a controlled aggregate morphology, in that the aggregates display a level of uniformity beyond conventional aggregate technologies. It is understood that the controlled aggregate structures form the nodular structure, and are unique to the seeded approach discussed above.

It is recognized that non-seeded approaches have been found to form particulate material, including approaches that decompose raw materials through consumption of an aluminum salt, such as aluminum nitrate or aluminum sulfate. However, these metal salt decomposition approaches form morphologically distinct particulates that are devoid of the seeded morphology, notably lacking the nodular structure. Typical non-seeded morphology has a smooth or hair-like outer surface texture. Examples of such non-seeded approaches include those disclosed in U.S. Pat. Nos. 3,108,888, 2,915,475, and JP2003-054941.

Treated Alumina Hydrate Particulate

In a particular embodiment, the alumina hydrate particulate may be further treated, such as by coating the alumina hydrate particulate with an inorganic coating, generally resulting in particle agglomerates of coated alumina hydrate particles. In particular, the alumina hydrate particulate may be coated with a ceramic oxide, such as a metal oxide. For example, the alumina hydrate particulate may be coated with a metal oxide, such as silica, tin oxide, vanadium oxide, tungsten oxide, manganese oxide, antimony oxide, niobium oxide, molybdenum oxide, or any combination thereof. In an exemplary embodiment, the metal oxide may be selected from metal oxides having a iso-electric point not greater than about 6.0, such as not greater than about 5.0, or not greater than about 3.0. In addition, the metal oxide may have a basic precursor, for example, including a metal that forms an oxidized water soluble anion of sodium or potassium. Further, the metal oxide may be substantially insoluble in water. In a particular example, the coating may be formed using a colloidal aluminous suspension, for example, including a seeded aluminous material. In an exemplary embodiment, the alumina hydrate particulate may be coated with silica.

Turning to the process by which a metal oxide coated alumina hydrate material may be manufactured, typically the alumina hydrate particulate is provided in a suspension (alternatively sol or slurry). In particular, the alumina hydrate particulate is a seeded alumina hydrate particulate that is in suspension, such as suspended in a portion of the solution in which it was formed in situ. The suspension may be diluted with deionized water to form a suspension with about 1 wt % to about 10 wt % alumina hydrate particulate based on the total weight of the suspension. In an alternative example, the alumina hydrate particulate may be provided in a dry form and added to deionized water (di-$H_2O$) to form the suspension having at least about 20 g/l alumina hydrate particulate, such as at least about 30 g/l alumina hydrate particulate, or even at least about 40 g/l alumina hydrate particulate. Further, the suspension may be heated to above 50° C., such as between about 50° C. and about 99° C., or even between about 80° C. and about 90° C., particularly between about 80° C. and about 85° C., and may be stirred at a low speed. Generally, the resulting suspension has a pH not greater than about 6.

Optionally, the surfaces of the alumina hydrate particles may be pre-treated, for example, to lower the iso-electric point of the alumina hydrate particles. In an exemplary embodiment, a surface modifying agent, such as a weak acid, may be added to the alumina hydrate suspension. For example, the surface modifying agent may include citric acid or Darvan C (Ammonium polymethacrylate, PMAA). In particular, a surface modifying agent is an agent that can reduce the iso-electric point of the alumina hydrate particles to less than 9.0. For example, the surface modifying agent may reduce the iso-electric point of the alumina hydrate particles to less than about 6.0, such as not greater than about 5.0. In an example, the surface modifying agent may be added to the alumina hydrate suspension in an amount between 1% and 10% by weight of the alumina hydrate particulate. In particular, the surface modifying agent may be added piecemeal. For example, about 55% of the allotted citric acid may be added to the alumina hydrate suspension and the suspension may be mixed, such as for at least 15 minutes, to ensure the citric acid is well dispersed in the alumina hydrate suspension. Subsequently, the remainder of the citric acid may be added to the suspension. In another example, citric acid may be divided into 3 to 5 parts and added one by one, stirring for at least about 5 minutes after each part is added. In each case, the suspension may be stirred at a speed adjusted for the viscosity of the suspension. For example, the suspension may be stirred at a greater speed to lower the viscosity and disperse the surface modifying agent.

In a further example, the pH of the suspension may be increased prior to the addition of the inorganic salt, such as through addition of a base, e.g., sodium hydroxide. For example, the pH may be adjusted to at least about 5, such as about 5 to about 7.

To facilitate coating with a metal oxide such as silica, a quantity of inorganic salt including an oxidized metal anion (e.g., an inorganic silicate salt) may be added to the suspension such that an amount of metal oxide precipitated to coat the alumina hydrate particulate is about 10% to about 50% by weight of the resulting treated alumina hydrate material, such as about 15% to about 40%, for example, about 20% to about 30% by weight. In an exemplary embodiment, the inorganic silicate salt may be a dilute sodium silicate solution. Alternatively, the inorganic silicate salt may include a Group I metal silicate, such as potassium silicate. In an example, the inorganic silicate may be added slowly until the pH of the alumina hydrate suspension increases, such as to between about 6.0 and 8.0, such as between about 7.0 and 8.0. In another example, the inorganic silicate is added until the pH is increased to a range of about 8.0 to about 10.0, such as about 8.5 to about 9.5. Once the pH has increased to the desired range, the remainder of the inorganic silicate may be added in conjunction with an acidifying agent, such as sulfuric acid, to maintain the desired pH. The alumina hydrate suspension may be stirred for at least 10 minutes, such as at least 20 minutes, or even about 30 minutes.

In an exemplary embodiment, an acidifying agent is added to reduce the pH of the alumina hydrate solution to a range of about 3.0 to about 8.0, such as about 4.0 to about 7.0, or about 5.0 to about 6.0. The acidifying agent may be an acid, such as an inorganic acid or an organic acid. In an example, an inorganic acid includes sulfuric acid, hydrochloric acid, nitric acid, phosphoric acid, or any combination thereof. In another example, the organic acid may include formic acid. In a particular example, the acidifying agent may be sulfuric acid. As a result of the process, the treated alumina hydrate material forms small aggregates of coated alumina hydrate particles.

In addition, the treated alumina hydrate material optionally may be washed to remove salts. For example, the suspension may be diluted with di-$H_2O$, mixed, and allowed to settle. The supernatant may be removed and the process (diluting, mixing, removing supernatant) may be repeated until at least about 90% of the estimate ions have been removed. In another example, the treated alumina hydrate material may be washed by centrifugation or may be treated via ion exchange.

In an exemplary embodiment, the liquid content is generally removed, desirably through a process that limits further agglomeration of the treated alumina hydrate material upon elimination of water, such as freeze drying, spray drying, or other techniques adapted to prevent excess agglomeration. In certain circumstances, ultrafiltration processing or heat treatment to remove the water might be used. Thereafter, the resulting mass may be crushed, such as to 100 mesh, if desired.

While the treated alumina hydrate material is desirably used in its boehmite form, the material may be heat treated to alter the crystalline structure of the alumina hydrate portion of the treated material. In an exemplary embodiment, the treated alumina hydrate material is heat treated by calcination at a temperature sufficient to cause transformation into a transitional phase alumina, or a combination of transitional phases. Typically, calcination or heat treatment is carried out at a temperature greater than about 250° C., but lower than 1100° C. At temperatures less than 250° C., transformation into the lowest temperature form of transitional alumina, gamma alumina, typically will not take place. According to certain embodiments, calcination is carried out at a temperature greater than 400° C., such as not less than about 450° C. The maximum calcination temperature may be less than 1100° C. or 1050° C., these upper temperatures usually resulting in a substantial proportion of theta phase alumina, the highest temperature form of transitional alumina.

At temperatures greater than 1100° C., typically the precursor will transform into the alpha phase. Contrary to untreated boehmite material, a metal oxide coated alumina hydrate material may be heated at high temperature without loosing its nanostructure, as a result of the metal oxide amorphous coating which may prevent alumina crystal growth during the calcinations process.

In another embodiment, the treated alumina hydrate material is calcined at a temperature lower than 950° C., such as within a range of 750° C. to 950° C. to form a substantial content of delta alumina. According to particular embodiments, calcination is carried out at a temperature less than about 800° C., such as less than about 775° C. or 750° C. to effect transformation into a predominant gamma phase.

According to an embodiment, the treated alumina hydrate material has a high pore volume. Pore volume may be measured in several ways, including Hg porosimetry and BET methods. The Hg porosimetry is measured in accordance to DIN 66133. Hg porosimetry results may be used to determine an Hg Cumulative Pore Volume, the total volume of the pores less than about 300 nm. In an exemplary embodiment, the Hg Cumulative Pore Volume of the treated alumina hydrate material is generally at least about 1.50 cc/g, and in particular at least about 1.65 cc/g, such as at least about 1.75 cc/g.

In addition, Hg porosimetry results may be used to determine a Hg Cumulative Pore Volume Index. The Hg Cumulative Pore Volume Index is the total volume of the pores between 10 nm and 1000 nm measured in cc/g multiplied by the specific density of the particulate material (e.g., 2.1 g/cc for HD silica, 2.9 g/cc for alumina hydrate, 2.7 g/cc for treated alumina hydrate with 25 wt % silica, and 2.78 g/cc for treated alumina hydrate with 15 wt % silica). In an exemplary embodiment, the Hg Cumulative Pore Volume Index of the treated alumina hydrate material is generally at least about 3.0 cc/cc, and in particular, at least about 4.0 cc/cc, such as at least about 6.0 cc/cc, or even at least about 6.5 cc/cc.

BET pore volume may be determined according to ISO 5794. BET pore volume results may be used to determine a BET Cumulative Pore Volume, the total volume of the pores less than about 300 nm. The BET Cumulative Pore Volume of the treated alumina hydrate material may be generally at least about 0.3 cc/g.

Additionally, a Cumulative Pore Volume Ratio is the ratio between the Hg Cumulative Pore Volume and the BET Cumulative Pore Volume. In an exemplary embodiment, the Cumulative Pore Volume Ratio of the treated alumina hydrate material is generally at least about 3.0, and in particular, at least about 4.0, such as at least about 5.0.

Further, a BET Surface Area may be determined according to ISO 5794. The value of the BET surface area measured in $m^2/g$ is multiplied by the specific density of the particulate material to obtain a value in $m^2/cc$. For example, the BET Surface Area of the treated alumina hydrate material may be generally at least about 150 $m^2/cc$, such as at least about 300 $m^2/cc$.

Additionally, a pre-compression loose packed density (LPD) may be defined as the amount, in grams, of aggregate that fills, without compression, a cavity divided by the volume of the cavity and divided again by the density of the material (e.g., 2.1 g/cc for HD silica, 2.9 g/cc for alumina hydrate, 2.7 g/cc for treated alumina hydrate with 25 wt % silica, and 2.78 g/cc for treated alumina hydrate with 15 wt % silica). For example, the LPD of the treated alumina hydrate material may be generally not greater than about 0.06 cc/cc, and in particular, not greater than about 0.05 cc/cc, such as not greater than about 0.04 cc/cc. In another embodiment, the treated alumina hydrate material is pre-compacted to achieve a post compaction LPD of at least about 0.10 cc/cc, such as at least about 0.13 cc/cc to facilitate the shipping and the handling of the particulate material.

According to an embodiment, the treated alumina hydrate material has a high resistance to compression. In an exemplary test, the material is placed within a cavity and compressed. A volume of the solid (cc) is determined by taking the weight of the material (g) and dividing by the density of the material (e.g., 2.1 g/cc for HD silica, 2.9 g/cc for alumina hydrate, 2.7 g/cc for treated alumina hydrate with 25 wt % silica, and 2.78 g/cc for treated alumina hydrate with 15 wt % silica). A volume of the air (cc) is the difference between the volume of the cavity (cc) and the volume of the solid (cc). A 100 psi Compaction Volume Ratio is defined as the ratio of the volume of the air to the volume of the solid when the solid is compressed at 100 psi. In an exemplary embodiment, the 100 psi Compaction Volume Ratio of the treated alumina hydrate material may be generally at least about 6.0 cc/cc, and in particular, at least about 8.0 cc/cc, such as at least about 10.0 cc/cc.

Additionally, a 500 psi Compaction Volume Ratio is defined as the ratio of the volume of the air to the volume of the solid when the solid is compressed at 500 psi. In an exemplary embodiment, the 500 psi Compaction Volume Ratio of the treated alumina hydrate material may be generally at least about 4.0 cc/cc, and in particular, at least about 5.0 cc/cc, such as at least about 6.0 cc/cc.

An isoelectric point (IEP) may be determined by measuring a charge of the material as a function of pH. In particulate, the IEP is the pH at which the net charge of the material is about 0. In an example, the IEP of the treated alumina hydrate material may be not greater than about 5.0, such as not greater than about 2.0, and in particular, not greater than about 1.5.

Particular embodiments of the treated alumina hydrate material may exhibit improved properties that provide advantages in particular applications. For example, particular embodiments of the treated alumina hydrate material may exhibit a high Compaction Volume Ratio, indicating aggregate strength, and a high Cumulative Pore Volume Index, indicating a high number of pores less than 1 micron in size. Such aggregate strength and porosity, for example, may lead to improved dispersion in polymer matrices. In addition, the surface properties of embodiments of the treated alumina hydrate particulate may lead to improved dispersion, improved absorption of liquids, and improved receptiveness to coatings.

Dispersing in a Polymer

In a particular embodiment, the silica coated alumina hydrate material may be dispersed within a polymer matrix. In a particular embodiment, the polymer matrix includes an elastomeric polymer. Elastomeric polymers are those polymers that when moderately deformed (stretched, twisted, spindled, mutilated, etc.), typically spring back into their original shape. One exemplary elastomer is lightly-crosslinked natural rubber. Another exemplary elastomeric polymer includes polyolefin, polyamide, polyurethane, polystyrene, diene, silicone, fluoroelastomer, and copolymers, block copolymers, or blends thereof. An exemplary silicone may include liquid silicone rubber (LSR) or high consistency rubber (HCR). Specific polymers that may be formulated as elastomeric materials include acrylonitrile butadiene styrene (ABS), ethylene propylene diene monomer rubber (EPDM), fluoroelastomer, polycaprolactam (nylon 6), nitrile butadiene rubber (NBR), or any combination thereof.

In a particular embodiment, the elastomeric polymer includes a diene elastomer. Diene elastomer or rubber means an elastomer resulting at least in part (i.e., a homopolymer or a copolymer) from diene monomers (monomers bearing two double carbon-carbon bonds, whether conjugated or not).

Exemplary diene elastomers include: (a) homopolymer obtained by polymerisation of a conjugated diene monomer having 4 to 12 carbon atoms; (b) copolymer obtained by copolymerisation of one or more dienes conjugated together or with one or more vinyl-aromatic compounds having 8 to 20 carbon atoms; (c) ternary copolymer obtained by copolymerisation of ethylene, of an alpha-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene; and (d) copolymer of isobutene and isoprene (butyl rubber), and also the halogenated, in particular chlorinated or brominated, versions of this type of copolymer.

Unsaturated diene elastomers, in particular those of type (a) or (b) above, are particularly adaptable for use in tire tread. An exemplary conjugated diene includes 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene, 2,4-hexadiene, or any combination thereof. An exemplary vinyl-aromatic compound includes, for example, styrene, ortho-, meta- and para-methylstyrene, the commercial mixture "vinyltoluene", para-tert butylstyrene, methoxystyrenes, chlorostyrenes, vinylmesitylene, divinylbenzene, vinylnaphthalene, or any combination thereof.

In another example, the diene elastomer of the composition may be selected from the group of highly unsaturated diene elastomers, which consists of polybutadienes (BR), synthetic polyisoprenes (IR), natural rubber (NR), butadiene-styrene copolymers (SBR), butadiene-isoprene copolymers (BIR), butadiene-acrylonitrile copolymers (NBR), isoprene-styrene copolymers (SIR), butadiene-styrene-isoprene copolymers (SBIR), or mixtures of these elastomers.

In an exemplary embodiment, the treated alumina hydrate material and the polymer matrix are combined and mixed to sufficiently disperse the treated alumina hydrate material. For example, the polymer matrix may be mixed for at least about 2 minutes. A coupling agent may be added to the polymer matrix. Alternatively, the treated alumina hydrate material may be further pretreated with the coupling agent.

Typically, a coupling agent includes at least one rubber reactive functional group that is reactive with the elastomer and includes at least one filler reactive functional group that is reactive with the filler. Generally, the coupling agent may establish a chemical or physical connection between the reinforcing filler and the elastomer. In addition, the coupling agent may facilitate dispersion of the filler within the elastomer. In a particular example, the coupling agent includes a silane-based filler reactive functional group.

In an exemplary embodiment, the polymer matrix may be cured. The elastomeric polymer may be cured through crosslinking, such as through vulcanization. In a particular embodiment, the elastomeric polymer is curable using sulfur-based agents, such as at least one of elemental sulfur, polysulfide, mercaptan, or any combination thereof. In another embodiment, the elastomer is curable using peroxide-based agents, such as metallic peroxides, organic peroxides, or any combination thereof. In another embodiment, the elastomer is curable using a platinum catalyst. In a further example, the formulation is curable using amine-based agents.

In particular, composite materials including a polymer and the treated alumina hydrate material may include the treated alumina hydrate material at loadings of about 20% to about 400%, such as about 30% to about 200%, based on the weight of the polymer. In general, composite materials including the treated alumina hydrate material may provide improved properties relative to composites including highly dispersible silica at lower total filler loading.

The properties of the resulting composite material may be influenced by how well the particulate material disperses in the polymer matrix. For example, dispersion of agglomerates in a polymer may be measured according to ASTM 2663. A Dispersibility Index may be defined as the dispersion of the agglomerates within a typical passenger tire formulation following the procedure described in more detail in Example 4. In an embodiment, the Dispersibility Index of the treated alumina hydrate material may be at least about 90%, and in particular, at least about 94%, such as at least about 95%.

Particular embodiments of a composite material including treated alumina hydrate may advantageously be used in tires. In particular, embodiments of the composite material provide improved mechanical properties and wear resistance. Such wear resistance of a composite material is especially useful in high severity applications, such as truck tires. Improvement in wear resistance also can be useful for passenger car tires to improve service life, or reduce tread thickness to maintain the same service life while further reducing rolling resistance.

Other Uses

In a particular embodiment, the treated alumina hydrate material may be dispersed within an inkjet paper coating. The inkjet paper coating may include polyvinyl alcohols, polymers, or appropriate combinations thereof. In a particular embodiment, the coating may be disposed on at least one side of a paper substrate. The inkjet paper coating may provide a high ink absorbing speed, i.e. fast drying times, and image permanence without swelling the paper substrate. Particular embodiments of the treated alumina hydrate material advantageously may absorb ink into a highly porous structure. In particular, treated alumina hydrate particulates exhibiting a high Hg Cumulative Pore Volume Index may advantageously prevent bleeding of ink.

In another embodiment, the invention is directed to a catalyst comprising a treated alumina hydrate material or calcined derivatives thereof and a catalytic agent disposed on the surface of the material. An example of a catalytic agent includes a metal, such as platinum, gold, silver, palladium, or any combination thereof. In another example, the catalytic agent may include a metal oxide or an adsorbed ion. In particular embodiments, treated alumina hydrate particulate may exhibit desirable durability in processes that place mechanical stress on catalytic particles. Such durability may be attributable to high Compaction Volume Ratios.

Catalytic materials may advantageously include anisotropic alumina materials, including untreated or treated alumina hydrate or calcined derivatives thereof. In particular, metal oxide coated alumina hydrates and derivatives thereof may form catalytic support materials that exhibit advantageous porosity and mechanical properties.

EXAMPLES

Example 1

Comparative samples are formed from commercially available alumina hydrate particulate and silica. These comparative samples are tested for porosity, surface area, and compression strength as illustrated in Example 3 and compared with treated alumina hydrate samples.

For example, an aqueous solution of an alumina hydrate (CAM 9010-1, available from Saint-Gobain Ceramics and Plastics Corporation), having a rod shape and a geometric aspect ratio around three, is freeze-dried and crushed to prepare Sample 1.

In another example, an aqueous solution of an alumina hydrate in the form of platelets (CAM 9080, available from Saint-Gobain Ceramics and Plastics Corporation) is freeze-dried and the powder crushed to prepare Sample 2.

In a further example, an aqueous solution of an alumina hydrate (CAM 9010-2, available from Saint-Gobain Ceramics and Plastics Corporation), having a rod shape and a geometric aspect ratio in the range of 6-10, is freeze-dried and crushed to prepare Sample 3.

In an additional example, an aqueous solution of an alumina hydrate (CAM 9010-2, available from Saint-Gobain Ceramics and Plastics Corporation), having a rod shape and a geometric aspect ratio in the range of 6-10, from Sample 3 is mixed with water to lower its viscosity. The solution is stirred as the ion exchange resin (Dowex Marathon A OH form) is added, until a pH of around 5 is reached. The mixture is filtered to remove the resin beads. The resulting solution is freeze-dried and crushed to prepare Sample 4.

Sample 5 is derived from a commercially available highly dispersible precipitated silica (Tixosil 68, available from Rhodia).

Sample 6 is derived from a commercially available highly dispersible precipitated silica (Tixosil 43, available from Rhodia).

Sample 7 is derived from a commercially available highly dispersible precipitated silica (Ultrasil 7000, available from Degussa).

Example 2

In addition, samples are prepared of treated alumina hydrate material for testing in comparison to the samples of Example 1.

For example, Sample 8 is prepared from an alumina hydrate suspension (CAM 9010-2, available from Saint-Gobain Ceramics and Plastics Corporation having a rod shape and a geometric aspect ratio in the range of 6-10) that has been treated with an ion exchange resin (procedure similar to Sample 4). The alumina hydrate suspension is diluted to 5 wt % with di-H2O in a 2 liters stainless steel reaction vessel. The suspension is stirred, preferably around 200 rpm, and heated to 85° C. An amount of citric acid equal to about 5.2% of the weight of the alumina hydride particles in the solution is added to lower the isoelectric point of the alumina hydride particles. First, about 55% of the citric acid is added, followed by 15 minutes of stirring before the remaining amount of citric acid is added. The stirring speed is adjusted to ensure the citric acid is well dispersed. (Prior its use citric acid is partially neutralized with NaOH to adjust its ph at approximately 5.)

An amount of sodium silicate is added such that the weight of silica precipitated is in the range 23-28 wt % of the total weight of the agglomerated solids, and preferably equal to approximately 25 wt %. A diluted solution of sodium silicate (1 volume of sodium silicate and 1 volume di-H2O) is added slowly to the mixture until a pH 9-9.5 is reached. Sulfuric acid is added simultaneously to the remaining sodium silicate to maintain the pH in the reaction vessel approximately between 8.5 and 9.5, and preferably approximately between 9 and 9.5. After the additions, the suspension is stirred for 30 minutes, the stirring speed being in the range 800-1600 rpm, and preferably around 1200 rpm. The temperature is around 81-82° C. Sulfuric acid is added to the suspension to drop the pH below 6, and preferably between 5 and 6.

The suspension is mixed with di-$H_2O$ and allowed to settle. The supernatant is removed and the process repeated until at least 90% of the estimated ions in solution are removed. The suspension is freeze-dried and crushed to obtain Sample 8.

Sample 9 is prepared in a similar manner to that described in relation to Sample 8 using an alumina hydrate suspension (CAM 9010-2, available from Saint-Gobain Ceramics and Plastics Corporation having a rod shape and a geometric aspect ratio in the range of 6-10), which is not treated with the ion exchange resin contrary to Sample 8.

After the nano-boehmite dispersion is introduced in the reaction vessel and diluted with di-H2O to a concentration of 5 wt %, the pH of the solution is adjusted to approximately 5 with sodium hydroxide.

Sample 10 is prepared in a similar manner to that described in relation to Sample 8, except the alumina hydrate suspension is diluted to a 1.5 wt % concentration.

Sample 11 is prepared in a similar manner to that described in relation to Sample 8, except the alumina hydrate is diluted to 5 wt % with a solution of citric acid such that the amount of citric acid is about 5.2% of the weight of the alumina hydrate.

Sample 12 is prepared in a similar manner to that described in relation to Sample 8, except five equal amounts of citric acid are added to the suspension. The solution is stirred for five minutes after each of the first four additions, and ten minutes after the last addition. Additionally, the sulfuric acid is diluted with di-H2O (one part sulfuric acid to four parts di-H2O) prior to addition to the suspension.

Sample 13 is prepared in a similar manner to that described in relation to Sample 8, except the suspension of alumina hydrate is not treated with the ions exchange resin, the reaction is performed without citric acid, and sodium hydroxide is used to increase the pH to a value between 6 and 7 prior to the addition of sodium silicate.

Sample 14 is prepared in a similar manner to that described in relation to Sample 8, except the suspension of alumina hydrate is not treated with the ions exchange resin, the reaction is performed without the citric acid, the pH is adjusted to about 6 with sodium hydroxide prior to the addition of the sodium silicate solution, and the pH is maintained at a pH of about 7 during the addition of the sodium silicate solution.

Sample 15 is prepared in a similar manner to that described in relation to Sample 8, except the suspension of alumina hydrate is not treated with the ions exchange resin, the pH is adjusted to about 5 with sodium hydroxide after the dilution to 5 wt % alumina hydrate, the citric acid is diluted with di-H2O and the pH of the citric acid solution is adjusted to about 5 to 5.5 with NaOH. The citric acid solution is added to the alumina hydrate suspension in five parts, and 15 wt % of sodium silicate is added after the pH of the alumina hydrate suspension was between about 6 to 7.

Example 3

The samples are tested for pore volume, packed density, and volume under compression. In particular, the samples are tested for compaction volume ratio at 100 psi and 500 psi, Hg Cumulative Pore Volume Index, Hg cumulative pore volume, BET cumulative pore volume, BET surface area, loose packed density (LPD), and isoelectric point.

For example, the volume of the solid (cc) is defined as the weight of the powder (g) divided by the density (e.g., 2.1 g/cc for HD silica and 2.9 g/cc for alumina hydrate). The volume of the air (cc) is defined as the difference between the volume of the cavity (cc) and the volume of the solid (cc). In an example, the 100 psi Compaction Volume Ratio is defined as the ratio of the volume of the air to the volume of the solid when the solid is compressed at 100 psi, and the 500 psi Compaction Volume Ratio is defined as the ratio of the volume of the air to the volume of the solid when the solid is compressed at 500 psi.

TABLE 1

Compaction Performance of Particulate Materials

| Sample reference | 100 psi Compaction Volume Ratio (cc/cc) | 500 psi Compaction Volume Ratio (cc/cc) |
| --- | --- | --- |
| Sample 1 | 2.8 | 2.2 |
| Sample 2 | 2.9 | 2.2 |
| Sample 3 | 3.2 | 2.6 |
| Sample 4 | 2.9 | 2.3 |
| Sample 5 | 6.2 | 4.7 |
| Sample 6 | 6.6 | 4.6 |
| Sample 7 | 4.9 | 4.0 |
| Sample 8 | 9.6 | 5.8 |
| Sample 9 | 9.6 | 5.9 |
| Sample 10 | 10.5 | 6.9 |
| Sample 11 | 9.7 | 6.1 |
| Sample 12 | 10.6 | 6.2 |
| Sample 13 | 9.3 | 5.4 |
| Sample 14 | 8.7 | 5.0 |
| Sample 15 | 8.4 | 5.2 |

It is believed that higher Compaction Volume Ratios influence dispersion of the particulate solids. Each of the treated alumina hydrate samples (Samples 8-15) exhibits increased 100 psi Compaction Volume Ratio and 500 psi Compaction Volume Ratio. In addition to being higher than the Ratios for untreated alumina hydrate samples (Samples 1-4), the Ratios for Sample 8-15 also were higher than traditionally used silicas and the newer highly dispersible precipitated silica (Samples 5-7).

Pore volume also may influence dispersibility of an agglomerated particulate. As such, the samples are tested using both Hg and BET techniques. The Hg Cumulative Pore Volume is defined as the total volume of the pores less than about 300 nm as determined by Hg porosimetry. Hg Cumulative Pore Volume Index is defined as the total volume of the pores between 10 nm and 1000 nm as determined by Hg porosimetry relative to the density of the material. The BET Cumulative Pore Volume is defined as the total volume of the pores less than about 300 nm as determined by BET techniques. The Cumulative Pore Volume Ratio is the ratio between the Hg Cumulative Pore Volume and the BET Cumulative Pore Volume.

TABLE 2

Cumulative Pore Volume for Particulate Samples

| Sample Reference | Hg Cumulative Pore Volume Index (cc/cc) | Hg Cumulative Pore Volume (cc/g) | BET Cumulative Pore Volume (cc/g) | Cumulative Pore Volume Ratio |
| --- | --- | --- | --- | --- |
| Sample 2 | 1.67 | 0.57 | 0.51 | 1.12 |
| Sample 3 | 1.31 | 0.46 | 0.51 | 0.90 |
| Sample 5 | 3.60 | 1.57 | 0.70 | 2.24 |
| Sample 6 | 5.10 | 1.99 | 1.04 | 1.91 |
| Sample 7 | 3.61 | 1.59 | 0.67 | 2.37 |
| Sample 9 | 5.89 | 1.53 | 0.34 | 4.50 |
| Sample 12 | 6.72 | 1.80 | 0.30 | 6.00 |
| Sample 13 | 6.97 | 1.82 | TBD | TBD |
| Sample 14 | 5.57 | 2.42 | TBD | TBD |
| Sample 15 | 7.17 | 1.90 | TBD | TBD |

Based on the Hg Cumulative Pore Volume Index, the treated alumina hydrate samples (Samples 9 and 12) appear to have comparable or higher porosities than the untreated alumina hydrate (Samples 2 and 3) and the silica samples (Samples 5-7). In particular, the treated alumina hydrate samples (Samples 9 and 12) have comparable or higher porosity relative to Tixosil 43 (Sample 6) despite having similar loose packed density.

For pore sizes less than 0.3 microns, the treated alumina hydrate samples (Samples 9 and 12) have comparable values to other samples. However, the Cumulative Pore Volume Ratio for the treated alumina hydrate samples (Samples 9 and 12) are significantly greater than other samples, which may be useful in some applications. The Sample 14 has a higher Hg Cumulative Pore Volume (for pore size lower than 0.3 microns). This may be interesting for some applications.

TABLE 3

BET Surface Area ($m^2$/cc) of Particulate Samples

| Sample reference | BET surface area ($m^2$/cc) |
| --- | --- |
| Sample 3 | 365 |
| Sample 5 | 330 |
| Sample 6 | 552 |
| Sample 7 | 443 |
| Sample 8 | 375 |
| Sample 9 | 327 |
| Sample 10 | 448 |
| Sample 11 | 386 |
| Sample 12 | 354 |
| Sample 13 | 373 |
| Sample 14 | 467 |
| Sample 15 | 392 |

The BET Surface Area is the surface area adjusted for density. In general, the adjusted BET Surface Areas of the treated alumina hydrate samples (Samples 9-12) are similar or slightly higher than the values for untreated alumina hydrate (Sample 3). In particular, those samples that are washed following treatment exhibit high surface area.

TABLE 4

Loose packed Density (LPD) of Participate Samples

| Formulation reference | LPD (cc/cc) |
|---|---|
| Sample 2 | 0.148 |
| Sample 3 | 0.179 |
| Sample 5 | 0.114 |
| Sample 6 | 0.043 |
| Sample 7 | 0.129 |
| Sample 8 | 0.037 |
| Sample 9 | 0.033 |
| Sample 10 | 0.052 |
| Sample 11 | 0.041 |
| Sample 12 | 0.033 |
| Sample 13 | 0.028 |
| Sample 14 | 0.039 |
| Sample 15 | 0.043 |

The LPD of the treated alumina hydrate samples (Samples 8-15) are significantly lower than the untreated alumina hydrate samples (Samples 2 and 3). Such a reduction in LPD may indicate a more open agglomerate structure in the treated alumina hydrate samples, which may lead to improved dispersion in polymeric materials. While the LPD values above are pre-compression, the particulate material can also be compacted to facilitate handling and shipping, altering the LPD.

TABLE 5

Isoelectric Point of Particulate Samples

| Formulation reference | IEP |
|---|---|
| Sample 3 | 9.5 |
| Sample 8 | 1.4 |
| Sample 11 | 1.4 |
| Sample 14 | 1.5 |

As illustrated in Table 5, the treated alumina hydrate samples (Samples 8 and 11) exhibit lower IEP than the untreated sample (Sample 3), which may indicate significant coverage by the silica coating.

Example 4

Sample compounds are prepared using elastomeric resins and particulate samples.

For example, Compound 1 is prepared based on a typical formulation for a carbon black and silica filled passenger tire. A Brabender PL2000 size mixer with a B350 mixing head with Banbury type rotors is used to perform the compounding. The mixing chamber has a volume of about 380 mL and is used to a fill factor of 0.7 (266 mL). The circulating oil is heated to approximately 60° C. using a rotor speed of 80 rpm. To the mixer, a first half of a polymer mixture is added.

The polymer mixture includes 103 pph of VSL 5025 (from Bayer AG), 25 pph of CB 24 (from Bayer AG), 7 pph of N220 (from Degussa). A filler derived from Sample 1 is added to the mixer. Between 68 and 95 pph, depending on the density of the filler so as to include the same volume of filler, is added to the polymer mixture during mixing. The quantity in grams can be determined by multiplying the amounts by a coefficient around 1.35. Subsequently, the remaining polymer is added to the mixer.

After blending for 2 minutes, 5.44 pph of Si 69 (from Degussa), 6 pph of Sunpar 2280 Oil, 1 pph Flectol H, 1 pph Nanox ZA, and 1.5 pph Sunproof Improved Wax (Uniroyal Chemical Co.) are added. The mixture is maintained at 140° C. for 3 minutes then spread on a sheet to cool.

Sulfur and a vulcanization accelerator are added to the mix on a 2-roll mill at about 30° C. For example, between 217.0 pph and 244.9 pph of the composite material, depending on the amount of filler added, is combined with 2.5 pph of zinc oxide, 3 pph of steric acid, 1.4 pph of Sulfur, 1.8 phh of CBS (from Bayer AG), 1.6 pph of DPG (from Bayer AG), and 0.2 pph of Tetrabenzylthiuram disulfide (TBzTD) are combined on a 2-roll mill at about 30° C.

Compound 2 is prepared as described in relation to Compound 1, except the filler is derived from the Sample 3 particulate.

Compound 3 is prepared as described in relation to Compound 1, except the filler is derived from the Sample 2 particulate.

Compound 4 is prepared as described in relation to Compound 1, except the filler is derived from the Sample 7 particulate.

Compound 5 is prepared as described in relation to Compound 1, except the filler is derived from the Sample 9 particulate.

Compound 6 is prepared as in described in relation to Compound 1, except the filler is derived from the Sample 12 particulate.

The dispersibility of the different compounds is measured using a disperGRADER in accordance with ISO 11345 Method B test. This test relies on optical microscopy of image analysis to evaluate the percentage of filler dispersion: 0% is indicative of a very poor dispersion, and 100% of a relatively perfect dispersion. Based on the data collected for precipitated silica, a filler-dispersion of at least approximately 90% may achieve desirable abrasion resistance. The Dispersibility Index of a sample is defined as the dispergrader value associated with dispersion in the passenger tire formulation described in relation to the compounds above.

TABLE 6

Dispersibility Index of Particulate Material

| Compound (Particulate Sample) | Dispersibility Index |
|---|---|
| Compound 1 (CAM 9010-1) | 6% |
| Compound 2 (CAM 9010-2) | 0% |
| Compound 3 (CAM 9080) | 49% |
| Compound 4 (Ultrasil 7000) | 93% |
| Compound 5 (Sample 9) | 89% |
| Compound 6 (Sample 12) | 97% |

As illustrated, the compounds formed from the treated alumina hydrate samples (Compounds 5 and 6) exhibit high dispersion, having a Dispersibility Index of at least about 89%. In particular, Compound 6 exhibits a Dispersibility Index greater than that of the silica filled compound (Compound 4). Such improved dispersibility may lead to improved properties, such as wear resistance.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below.

Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A composite material comprising:
   a polymer matrix; and
   a particulate material dispersed within the polymer matrix, the particulate material including a metal oxide coated alumina hydrate, the coating of the metal oxide coated alumina hydrate formed in a solution including an ion exchanged alumina hydrate treated with citric acid prior to coating the alumina hydrate with the metal oxide;
   wherein the particulate material has a 500 psi Compaction Volume Ratio of at least about 6.0 cc/cc.

2. The composite material of claim 1, wherein the particulate material has a 100 psi Compaction Volume Ratio of at least about 6.0 cc/cc.

3. The composite material of claim 1, wherein the metal oxide coated alumina hydrate includes a metal oxide with an IEP not greater than about 6.0.

4. The composite material of claim 1, wherein the alumina hydrate has a geometric aspect ratio of at least about 3.0.

5. The composite material of claim 1, wherein the particulate material has an isoelectric point (IEP) of at most about 2.0.

6. The composite material of claim 1, wherein the particulate material has a loose packed density (LPD) of not greater than about 0.06 cc/cc.

7. The composite material of claim 1, wherein the particulate material has a BET Cumulative Pore Volume of at least about 0.3 cc/g.

8. The composite material of claim 1, wherein the particulate material has a Hg Cumulative Pore Volume of at least about 1.5 cc/g.

9. The composite material of claim 1, wherein the particulate material has a Hg Cumulative Pore Volume Index of at least about 3.0 cc/cc.

10. The composite material of claim 1, wherein the polymer is an elastomer.

11. The composite material of claim 1, wherein the particulate material has a Hg Cumulative Pore Volume of at least 1.65 cc/g.

12. The composite material of claim 3, wherein the metal oxide is a silica.

13. The composite material of claim 10, wherein the elastomer is a curable resin.

14. A composite material comprising:
    a polymer matrix; and
    an aggregate including a particle with a geometric aspect ratio of at least about 3.0, the aggregate including a metal oxide coated alumina hydrate, the coating of the metal oxide coated alumina hydrate formed in a solution including an ion exchanged alumina hydrate treated with citric acid prior to coating the alumina hydrate with the metal oxide, the aggregate having a Dispersibility Index of at least 94%.

15. The composite material of claim 14, wherein the metal oxide coated alumina hydrate includes a metal oxide with an IEP of not greater than about 6.0.

16. The composite material of claim 14, wherein the alumina hydrate is a seeded alumina hydrate.

17. The composite material of claim 14, wherein the aggregate has a 500 psi Compaction Volume Ratio of at least 6.0 cc/cc.

18. The composite material of claim 14, wherein the aggregate has a Hg Cumulative Pore Volume of at least 1.65 cc/g.

19. The composite material of claim 15, wherein the metal oxide is a silica.

20. A particulate material comprising a metal oxide coated alumina hydrate with a Dispersibility Index of at least about 90%, the coating of the metal oxide coated alumina hydrate formed in a solution including an ion exchanged alumina hydrate treated with citric acid prior to coating the alumina hydrate with the metal oxide.

21. The particulate material of claim 20, wherein the metal oxide coated alumina hydrate is a metal oxided coated seeded alumina hydrate.

22. The particulate material of claim 20, wherein the metal oxide coated alumina hydrate includes a metal oxide with a IEP of not greater than about 6.0.

23. The particulate material of claim 20, wherein the particulate material has a 500 psi Compaction Volume Ratio of at least 6.0 cc/cc.

24. The particulate material of claim 22, wherein the metal oxide is a silica.

* * * * *